US012741263B2

(12) United States Patent
Heo et al.

(10) Patent No.: US 12,741,263 B2

(45) Date of Patent: Sep. 22, 2026

(54) REACTOR

(71) Applicant: LG Chem, Ltd., Seoul (KR)

(72) Inventors: Seong Beom Heo, Daejeon (KR); Jin Lee, Daejeon (KR); Jong Yeol Baek, Daejeon (KR); Won Hee Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 786 days.

(21) Appl. No.: 18/018,091

(22) PCT Filed: Sep. 7, 2021

(86) PCT No.: PCT/KR2021/012137

§ 371 (c)(1),
(2) Date: Jan. 26, 2023

(87) PCT Pub. No.: WO2022/055224

PCT Pub. Date: Mar. 17, 2022

(65) Prior Publication Data

US 2023/0285928 A1 Sep. 14, 2023

(30) Foreign Application Priority Data

Sep. 11, 2020 (KR) ........................ 10-2020-0117211
Sep. 6, 2021 (KR) ........................ 10-2021-0118408

(51) Int. Cl.
*B01J 19/18* (2006.01)
*B01J 19/00* (2006.01)
*C08F 2/01* (2006.01)

(52) U.S. Cl.
CPC ........... *B01J 19/18* (2013.01); *B01J 19/0066* (2013.01); *B01J 19/1875* (2013.01); *C08F 2/01* (2013.01);

(Continued)

(58) Field of Classification Search
None
See application file for complete search history.

(56) References Cited

U.S. PATENT DOCUMENTS 2,363,834 A * 11/1944 Crater .................. C07C 201/02
422/163
3,909,207 A 9/1975 Bir
(Continued)

FOREIGN PATENT DOCUMENTS

CN 2813091 Y 9/2006
CN 205435719 U 8/2016
(Continued)

OTHER PUBLICATIONS

International Search Report for Application No. PCT/KR2021/012137 mailed Dec. 28, 2021, 2 pages.
(Continued)

*Primary Examiner* — Jennifer A Leung
(74) *Attorney, Agent, or Firm* — Lerner David LLP

(57) ABSTRACT

A reactor is disclosed herein. In some embodiments, a reactor comprises a reactor tank having an accommodation space therein for performing a polymerization reaction of a reactive fluid, an outer refrigerant jacket positioned outside the reactor tank and having a refrigerant flowing there-through, and an inner refrigerant jacket inside the reactor tank and having a refrigerant flowing therethrough. The refrigerants of the outer refrigerant jacket and the inner refrigerant jacket may flow in opposite directions to each other.

5 Claims, 4 Drawing Sheets

(52) U.S. Cl.
CPC ................. *B01J 2219/00083* (2013.01); *B01J 2219/00085* (2013.01); *B01J 2219/0009* (2013.01); *B01J 2219/00094* (2013.01); *B01J 2219/00779* (2013.01)

(56) References Cited

U.S. PATENT DOCUMENTS

| | | | |
|---|---|---|---|
| 5,150,831 A | | 9/1992 | Jordan et al. |
| 5,477,704 A | | 12/1995 | Wright |
| 5,883,292 A | | 3/1999 | Dassel et al. |
| 5,989,500 A | | 11/1999 | Peacock |
| 2005/0115699 A1 | | 6/2005 | Nuris et al. |
| 2005/0161205 A1 | * | 7/2005 | Ashe ..................... F28D 7/0041 165/168 |
| 2011/0178254 A1 | | 7/2011 | Matsuba et al. |
| 2014/0148561 A1 | | 5/2014 | Paul et al. |
| 2018/0050318 A1 | | 2/2018 | Shin et al. |
| 2019/0263745 A1 | | 8/2019 | Lee et al. |
| 2021/0008519 A1 | | 1/2021 | Feller et al. |

FOREIGN PATENT DOCUMENTS

| | | | | |
|---|---|---|---|---|
| CN | 106732295 | A | | 5/2017 |
| CN | 209098308 | U | | 7/2019 |
| CN | 110302736 | A | | 10/2019 |
| CN | 110339796 | A | | 10/2019 |
| CN | 111013493 | A | | 4/2020 |
| EP | 0888813 | A1 | | 1/1999 |
| GB | 1404163 | A | | 8/1975 |
| JP | S4813979 | Y1 | | 4/1973 |
| JP | 57045333 | A | * | 3/1982 |
| JP | 04016229 | A | * | 1/1992 |
| JP | H06200012 | A | | 7/1994 |
| JP | H07503662 | A | | 4/1995 |
| JP | 2005002194 | A | | 1/2005 |
| JP | 2014501310 | A | | 1/2014 |
| JP | 2019025433 | A | | 2/2019 |
| JP | 2020526644 | A | | 8/2020 |
| KR | 20040050763 | A | | 6/2004 |
| KR | 20090027025 | A | | 3/2009 |
| KR | 100939494 | B1 | | 1/2010 |
| KR | 101415480 | B1 | | 7/2014 |
| KR | 20140084486 | A | | 7/2014 |
| KR | 20160111664 | A | | 9/2016 |
| KR | 101666634 | B1 | | 10/2016 |
| KR | 20190025439 | A | | 3/2019 |
| KR | 20190027623 | A | | 3/2019 |
| KR | 20190093052 | A | | 8/2019 |
| KR | 20200029003 | A | | 3/2020 |
| KR | 20200077109 | A | | 6/2020 |
| WO | 2010032302 | A1 | | 3/2010 |
| WO | 2019011811 | A1 | | 1/2019 |

OTHER PUBLICATIONS

Extended European Search Report including Written Opinion for Application No. 21867090.9 dated Dec. 18, 2023, pp. 1-12.

Search Report dated Jul. 21, 25 from the Office Action for Chinese Application No. 202180056374.3 issued Jul. 22, 2025, pp. 1-3.

* cited by examiner

REACTOR

CROSS-REFERENCE TO RELATED APPLICATION

The present application is a national phase entry under 35 U.S.C. 371 of International Application No. PCT/KR2021/012137, filed on Sep. 7, 2021, which claims priority from Korean Patent Application No. 10-2020-0117211, filed on Sep. 11, 2020, and Korean Patent Application No. 10-2021-0118408, filed on Sep. 6, 2021, which are incorporated by reference herein.

TECHNICAL FIELD

The present disclosure relates to a reactor.

BACKGROUND ART

Two or more unit materials or monomers serving as raw materials of polymers are coupled through a chemical reaction to produce compounds having high molecular weight, and this chemical reaction is referred to as polymerization. The polymers are called dimers, trimers, or multimers according to the degree of polymerization.

The polymerization reaction occurs in reactors. The polymerization reaction may occur as monomers, solvents, and catalysts are input into the reactors. Polybutene is a representative example of the cationic polymerization. The reactor, in which the polybutene polymerization occurs, needs to be maintained at a low temperature for stable polymerization. According to the related art, it is required to maintain a low temperature of −90 degrees Celsius to −60 degrees Celsius. However, in the related art, it is difficult to continuously maintain the inside of a reactor at a uniform low temperature state. Accordingly, it is difficult to obtain stable molecular weight, and it is difficult for a selective reaction of isomers to occur.

PRIOR ART DOCUMENTS (Patent Document) Korean Patent Publication No. 10-2019-0027623

DISCLOSURE OF THE INVENTION

Technical Problem

One aspect of the present disclosure is to provide a reactor in which low-temperature heat transfer may be uniformly performed.

Technical Solution

A reactor according to an embodiment of the present disclosure comprises: a reactor tank having an accommodation space therein for performing a polymerization reaction of a reactive fluid; an outer refrigerant jacket positioned outside the reactor tank and having a refrigerant flowing therethrough; and an inner refrigerant jacket positioned inside the reactor tank and having a refrigerant flowing therethrough. The refrigerants of the outer refrigerant jacket and the inner refrigerant jacket may flow in opposite directions to each other.

Advantageous Effects

According to the present disclosure, the refrigerant jackets, through which the refrigerants flow, are provided inside the reactor in the form of an inward and outward double structure, and thus, it is possible to uniformly cool the reactants.

The inlet and outlet paths for the refrigerants are provided on opposite sides in the jacket positioned relatively inside and the jacket positioned relatively outside, and thus, the refrigerants flow in reverse directions to each other. Accordingly, it is possible to more uniformly cool the reactants (reactive fluids).

Also, a burden on a thermal conductor is lowered through an efficient heat exchange process, and thus, a load of a cooler (reactor) is reduced. Accordingly, energy efficiency may increase.

MODE FOR CARRYING OUT THE INVENTION

Figure 1:
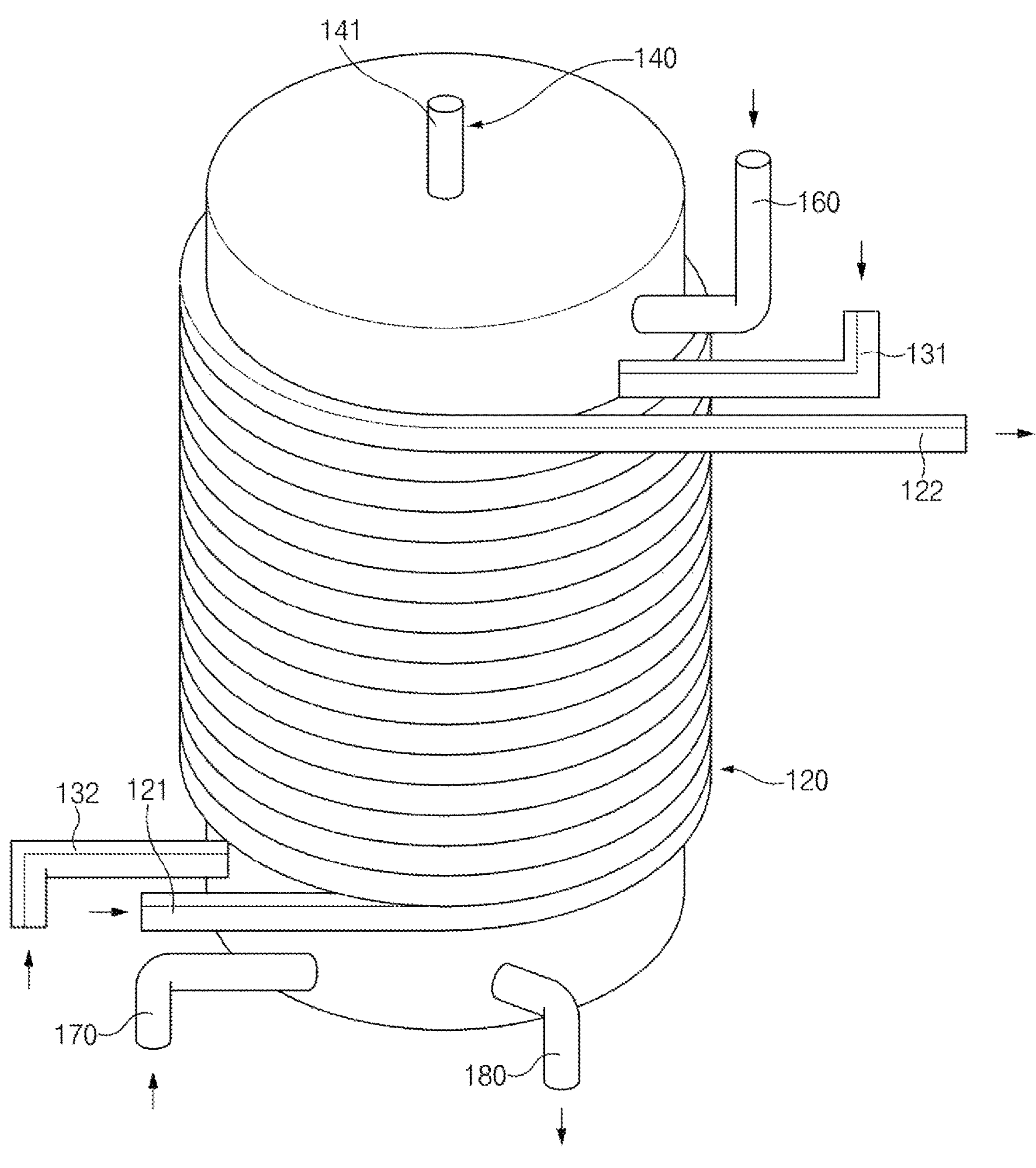
FIG. 1 is a perspective view exemplarily showing a reactor according to an embodiment of the present disclosure.

The objects, specific advantages, and novel features of the present disclosure will be more clearly understood from the following detailed description and preferred embodiments taken in conjunction with the accompanying drawings. In the specification, when reference numerals are given to elements in each drawing, it should be noted that the same elements will be designated by the same reference numerals if possible although they are shown in different drawings. However, the present disclosure may be embodied in various different forms, and is not limited to the embodiments described herein. Also, in describing the present disclosure, detailed description related to well-known functions will be omitted so as not to unnecessarily obscure subject matters of the present disclosure.

Figure 2:
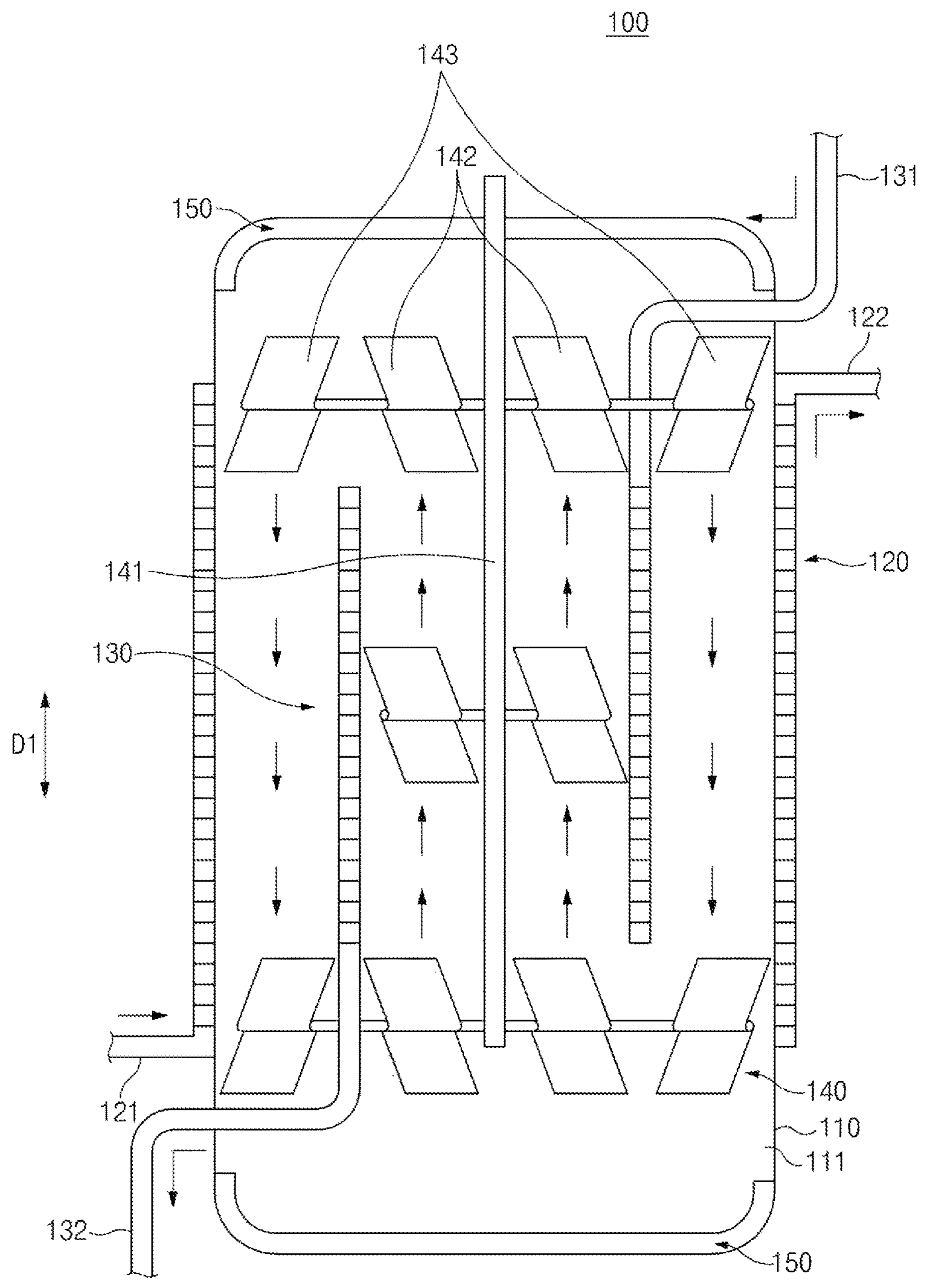
FIG. 2 is a cross-sectional view exemplarily showing a reactor according to an embodiment of the present disclosure.
Figure 3:
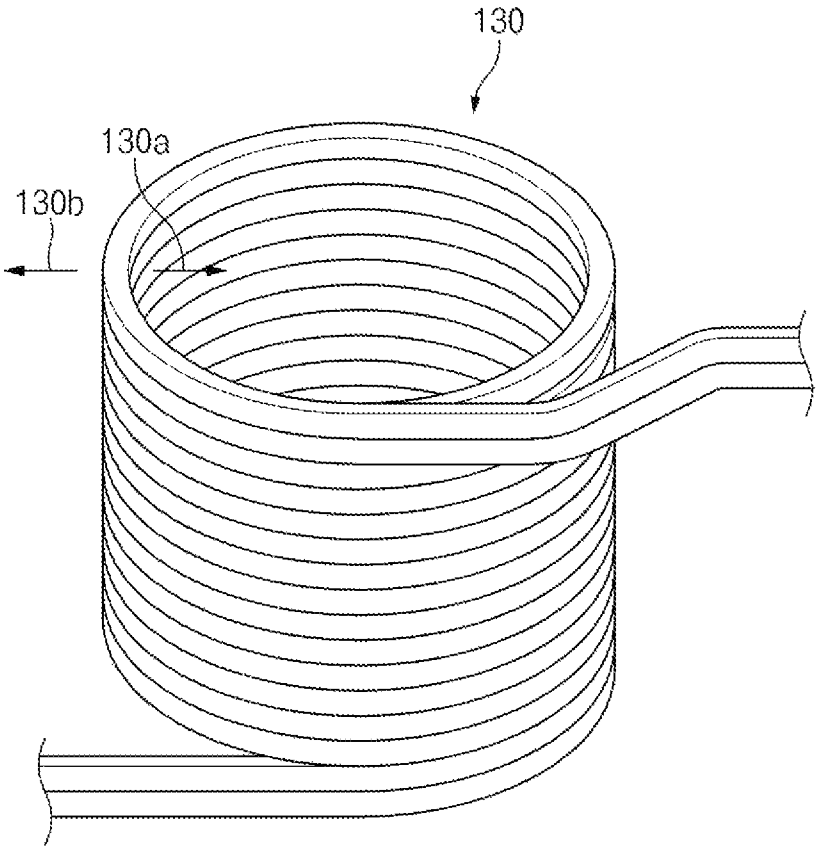
FIG. 3 is a perspective view exemplarily showing an inner refrigerant jacket in a reactor according to an embodiment of the present disclosure.

FIG. 1 is a perspective view exemplarily showing a reactor according to an embodiment of the present disclosure, FIG. 2 is a cross-sectional view exemplarily showing a reactor according to an embodiment of the present disclosure, and FIG. 3 is a perspective view exemplarily showing an inner refrigerant jacket in a reactor according to an embodiment of the present disclosure.

Referring to FIGS. 1 to 3, a reactor 100 according to an embodiment of the present disclosure comprises a reactor tank 110 having an accommodation space 111 therein, an outer refrigerant jacket 120 which is positioned outside the reactor tank 110 and through which a refrigerant flows, and an inner refrigerant jacket 130 which is positioned inside the reactor tank 110 and through which a refrigerant flows.

Also, the reactor 100 according to an embodiment of the present disclosure may further comprise an impeller 140 and a guide vane 150.

More specifically, the reactor tank 110 may have the accommodation space 111 therein in which a polymerization reaction of a reactive fluid is performed. Here, the reactor tank 110 may be provided in the form of a cylindrical vessel.

Also, as monomers, solvents, and catalysts are input into the accommodation space 111 of the reactor tank 110, the polymerization reaction may occur.

Here, polybutene polymerization may occur in the accommodation space 111 of the reactor tank 110. That is, a polymer may be manufactured as the polymerization reaction occurs inside the reactor tank 110, and for example, a polybutene polymer may be manufactured.

For example, lewis acid such as boron trifluoride ($BF_3$) or aluminum chloride ($AlCl_3$) may be used as the catalyst.

The outer refrigerant jacket 120 is positioned outside the reactor tank 110, and the refrigerant may flow therethrough.

The outer refrigerant jacket 120 may comprise an outer refrigerant inlet 121 through which the refrigerant enters in the outer refrigerant jacket 120 and an outer refrigerant outlet 122 through which the refrigerant is discharged.

Meanwhile, the outer refrigerant jacket 120 may be in the form of a pipe in which the refrigerant flows.

Also, the pipe of the outer refrigerant jacket 120 may be wound in a coil shape. Accordingly, the outer refrigerant jacket 120 may surround the outer surface of the reactor tank 110.

In addition, the pipe of the outer refrigerant jacket 120 may have a cross-section of a quadrangle. That is, the cross-section may have a pipe having "□" shape. Accordingly, the refrigerant flowing in the outer refrigerant jacket 120 may be given directionality.

The inner refrigerant jacket 130 is positioned inside the reactor tank 110, and the refrigerant may flow therethrough.

The inner refrigerant jacket 130 may comprise an inner refrigerant inlet 131 through which the refrigerant enters in the inner refrigerant jacket 130 and an inner refrigerant outlet 132 through which the refrigerant is discharged.

Also, the inner refrigerant jacket 130 may be in the form of a pipe in which the refrigerant flows.

In addition, the pipe of the inner refrigerant jacket 130 may have a cross-section of a quadrangle. That is, the cross-section may have a pipe having "□" shape. Accordingly, the refrigerant flowing in the inner refrigerant jacket 130 may be given directionality.

Also, the pipe of the inner refrigerant jacket 130 may be wound in a coil shape.

Here, the inner refrigerant jacket 130 may have a partition wall so that flow paths are formed on the inside 130*a* and outside 130*b* of the inner refrigerant jacket 130, e.g., a first flow path on the inside of the inner refrigerant jacket and a second flow path on the outside of the inner refrigerant jacket, wherein the outside of the inner refrigerant jacket faces the walls of the reactor tank.

Accordingly, the directionality of the reactive fluid is induced, and it is possible to secure a reaction time in a limited space.

Meanwhile, the refrigerants of the outer refrigerant jacket 120 and the inner refrigerant jacket 130 may flow in opposite directions to each other.

Also, the outer refrigerant inlet 121 and the inner refrigerant inlet 131 may be positioned on opposite sides of the reactor tank and spaced apart in vertical direction D1, and the outer refrigerant outlet 122 and the inner refrigerant outlet 132 may be positioned on opposite sides of the reactor tank and spaced apart in the vertical direction reactor D1.

In addition, the outer refrigerant inlet 121 and the inner refrigerant outlet 132 may be positioned at a lower end of the reactor tank 110, and the outer refrigerant outlet 122 and the inner refrigerant inlet 131 may be positioned at an upper end of the reactor tank 110.

Accordingly, inlet portions and outlet portions of the refrigerants in the outer refrigerant jacket 120 and the inner refrigerant jacket 130 are positioned on the opposite sides of the reactor tank, and thus, the refrigerants flow in reverse directions to each other. Therefore, uniform heat transfer is achieved inside the reactor tank 110, and the reactive fluid may be uniformly maintained at a low temperature. Here, for example, the reactive fluid may be maintained at an extremely low temperature through the outer refrigerant jacket 120 and the inner refrigerant jacket 130. Also, heat is easily transferred to the reactive fluid through the outer refrigerant jacket 120 and the inner refrigerant jacket 130, and thus, the reaction may smoothly occur even when the temperature of the refrigerant is higher than that in the case that only the outer refrigerant jacket 120 is provided in the reactor tank 110. Also, for example, a catalyst is input to the reactor 100 of the present disclosure so as to make a reaction of the reactive fluid while maintaining the reactor tank 110 at a temperature of −30° C. to −49° C. Even if the catalyst having a temperature similar to this temperature or lower by −10° C. to −20° C. is supplied, heat may be appropriately transferred, and the reaction may smoothly occur. However, when only the outer refrigerant jacket 120 is provided in the reactor 100, efficiency of heat transfer deteriorates. Thus, the input temperature of the refrigerant has to be significantly reduced. Thus, the reactor 100 of the present disclosure may efficiently transfer heat to the reactive fluid through the outer refrigerant jacket 120 and the inner refrigerant jacket 130, and thus, a reaction temperature may be secured even if a refrigerant having a higher temperature is supplied to the reactor 100. Accordingly, energy the efficiency is significantly improved.

Also, the reactive fluid may be uniformly maintained in a low temperature state, and thus, stable polymerization may be continuously made. Thus, stable molecular weight may be obtained, and cationic polymerization of isomers is possible.

The impeller 140 is disposed in an inner portion of the reactor tank 110 and may induce directionality of the reactive fluid.

The impeller 140 is positioned on the inside 130*a* and outside 130*b* of the inner refrigerant jacket 130, and may induce ascent of the reactive fluid on the inside 130*a* of the inner refrigerant jacket 130 and descent of the reactive fluid on the outside 130*b* of the inner refrigerant jacket 130.

The impeller 140 may comprise a rotary shaft 141 rotatably mounted to the reactor tank 110 and impeller blades 142 and 143 mounted to the rotary shaft 141.

Here, the impeller blade 142 positioned on the inside 130*a* of the inner refrigerant jacket 130 and the impeller blade 143 positioned on the outside 130*b* are provided so as to make fluids flow in opposite directions to each other. Here, for example, the impeller blade 142 positioned on the inside 130*a* of the inner refrigerant jacket 130 and the impeller blade 143 positioned on the outside 130*b* are mounted to the rotary shaft 141 while having opposite inclinations to each other.

Figure 4:
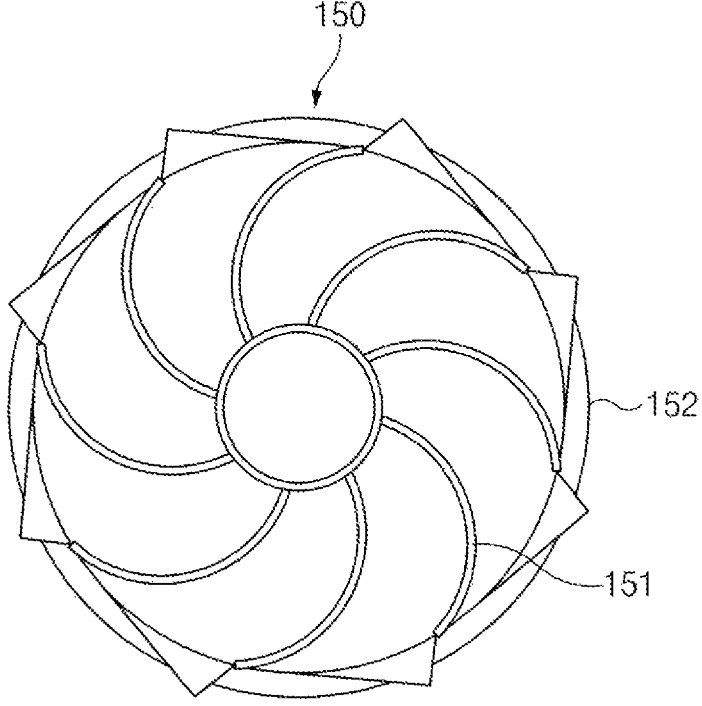
FIG. 4 is a plan view exemplarily showing a guide vane in a reactor according to an embodiment of the present disclosure.

FIG. 4 is a plan view exemplarily showing a guide vane in a reactor according to an embodiment of the present disclosure.

Referring to FIGS. 2 and 4, a guide vane 150 may guide a flow of the reactive fluid in the same direction as a flow direction of the reactive fluid by the impeller 140 inside the reactor tank 110.

In the reactor, the guide vane 150 comprises a support plate 152 provided in each of an upper portion and a lower portion inside the reactor tank 110 and a guide part 151 protruding from the support plate 152 toward the inside of the reactor tank 110.

The support plates 152 may be fixed to the ceiling surface and the bottom surface of the reactor tank 110.

The guide part 151 may spirally protrude from the support plate 152.

Accordingly, the guide vane 150 may guide the flow of the reactive fluid. That is, the guide vane 150 may guide the reactive fluid that flows in the accommodation space 111 of the reactor tank 110 by the impeller 140 so that the reactive fluid easily circulates through the inside 130*a* and the outside 130*b* of the inner refrigerant jacket 130. Here, for example, the guide part 151 positioned on an upper side within the reactor tank 110 may guide the fluid, which ascends on the inside 130*a* of the inner refrigerant jacket 130, to move to the outside 130*b* of the inner refrigerant jacket 130, and the guide part 151 positioned on a lower side within the reactor tank 110 may guide the fluid, which descends on the outside 130*b* of the inner refrigerant jacket 130, to move to the inside 130*a* of the inner refrigerant jacket 130.

Therefore, it is possible to uniformly circulate the fluid inside the reactor 100, through the impeller 140, which is provided with the impeller blades 142 and 143 on the inside and outside 130*a* and 130*b* of the inner refrigerant jacket 130, and the guide vane 150 inducing the flow of the fluid.

Referring to FIGS. 1 and 2, the reactor 100 according to an embodiment of the present disclosure may further comprise a monomer/solvent inlet 160 for supplying a monomer and a solvent into the reactor tank 110, a catalyst inlet 170 for supplying a catalyst into the reactor tank 110, and a reactant outlet 180 through which a reactant is discharged.

The monomer/solvent inlet 160 and the catalyst inlet 170 may be provided on the sides on which the outer refrigerant inlet 121 and the inner refrigerant inlet 131 are positioned. Accordingly, it may be advantageous in terms of securing a low temperature of the reactive fluid.

Here, the monomer/solvent inlet 160 may be provided on the side on which the inner refrigerant inlet 131 is positioned, and the catalyst inlet 170 may be provided on the side on which the outer refrigerant inlet 121 is positioned.

Here, the catalyst inlet 170 may be provided on one lower end of the reactor tank 110, and the monomer/solvent inlet 160 may be provided on the other upper end of the reactor tank 110.

Preparation Example 1

A reactor was manufactured, which has a vessel shape with refrigerant jackets on the outer side and the inside and is provided with an impeller therein. Here, refrigerants in the refrigerant jackets on the outer side and the inside were made to flow in reverse directions to each other.

A catalyst solution, monomer (isobutylene), and a solvent (hexane&DCM) were put into the reactor and reacted at −40 degrees for 30 minutes. Here, the monomer with a concentration of 40 wt % was put into the reactor.

Preparation Example 2

The same processes as those in Preparation Example 1 were performed except that a concentration of a monomer put into the reactor is 55 wt %.

Comparative Example 1

The same processes as those in Preparation Example 1 were performed except that a refrigerant jacket is present only on the outer side of a reactor.

Comparative Example 2

The same processes as those in Comparative Example 1 were performed except that a concentration of a monomer is 55 wt %.

Experimental Example 1

Temperatures at the upper and lower ends of the reactor were checked, and temperature distribution was confirmed.

Then, the solvent was removed from the reactant solution to obtain a final product, and a yield was confirmed.

The temperatures at the upper and lower ends of the reactor, the yield, etc., which were measured through the experiment in Experimental Example E 1, are shown in Table 1 below.

TABLE 1

| | Concentration of monomer (wt %) | Temperature at upper portion of reactor (° C.) | Temperature at lower portion of reactor (° C.) | Temperature of refrigerant (° C.) | Difference in temperature between reactive material and refrigerant (° C.) | Molecular weight (Mw) | Yield (%) |
|---|---|---|---|---|---|---|---|
| Comparative Example 1 | 40 | −39.8 | −55.7 | −65.1 | about 25 | 450 k | 43 |
| Preparation Example 1 | | −40.1 | −45.2 | −56.4 | about 15 | 450 k | 48 |
| Comparative Example 2 | 55 | −23.2 | −31.1 | −70.0 | about 45 | 248 k | 45 |
| | | | | | | 450 k | 0.2 |
| Preparation Example 2 | | −39.9 | −46.7 | −67.2 | about 27 | 450 k | 62 |

Referring to Table 1, it can be seen that while the yields of the molecular weight (Mw) 450 k in Comparative Example 1 and Comparative Example 2 are 0.2% to 43%, the yields of the molecular weight (Mw) 450 k in Preparation Example 1 and Preparation Example 2 are as significantly high as 48% to 62%. Particularly, when the concentration of the monomer is 55 wt %, it can be seen that while the yield of the molecular weight (Mw) 450 k necessary for the production of a product in Comparative Example 2 is as little as 0.2%, the yield of the molecular weight (Mw) 450 k in Preparation Example 2 is significantly increased to 62%. Meanwhile, Comparative Example 2 shows a yield of 62% of the molecular weight (Mw) 248 k unnecessary for the production of a product. It can be seen that while differences in temperatures between the upper and lower portions of the reactor in Comparative Example 1 and Comparative Example 2 are 7.9° C. to 15.9° C., differences in temperatures between the upper and lower portions of the reactor in Preparation Example 1 and Preparation Example 2 are as significantly low as 5.1° C. to 6.8° C. Thus, it can be seen that Preparation Example 1 and Preparation Example 2 may perform significantly more uniform heat transfer than Comparative Example 1 and Comparative Example 2.

When the concentration of the monomer is 40 wt %, it can be seen that while a difference in temperatures between a reactive material and a refrigerant is about 25° C. in Comparative Example 1, a difference in temperatures between a reactive material and a refrigerant is as significantly low as about 15° C. in Preparation Example 1. Also, when the concentration of the monomer is 55 wt %, it can be seen that while a difference in temperatures between a reactive material and a refrigerant is about 45° C. in Comparative Example 2, a difference in temperatures between a reactive material and a refrigerant is as significantly low as about 27° C. in Preparation Example 1. Thus, it can be seen that Preparation Examples 1 and 2 have better heat transfer efficiency than Comparative Examples 1 and 2.

Thus, it can be seen that the reactors in Comparative Example 1 and Comparative Example 2 have refrigerant jackets only on the outer sides thereof and thus exhibit low heat transfer efficiency. Accordingly, it is impossible to make a design for increasing the concentration of the monomer, and there is a limit in improving productivity per unit time.

However, the reactors in Preparation Example 1 and Preparation Example 2 have refrigerant jackets not only on the outer side but also the inside. Thus, it can be seen that the heat transfer areas are increased to exhibit high heat transfer efficiency, and enhancement of flowability of fluid is promoted to increase a heat transfer rate per unit time. That is, it can be seen that the directionality of the reactive fluid is induced, and it is possible to secure a reaction time in a limited space. Through this, it is possible to make a design for increasing the concentration of monomer while achieving sufficient capacity of the cooler (reactor). Thus, there are effects of making it possible to significantly increase productivity per unit time and secure material properties.

Although the present disclosure has been described in detail through the specific embodiments, these are intended to specifically describe the present disclosure, and the present disclosure is not limited thereto. Various modifications can be made within the technical idea of the present disclosure by those with ordinary skill in the art.

Also, the specific protection scope of the disclosure can become apparent from the appended claims.

DESCRIPTION OF THE SYMBOLS

100: Reactor
110: Reactor tank
111: Accommodation space
120: Outer refrigerant jacket
121: Outer refrigerant inlet
122: Outer refrigerant outlet
130: Inner refrigerant jacket
131: Inner refrigerant inlet
132: Inner refrigerant outlet
140: Impeller
141: Rotary shaft
142,143: Impeller blade
150: Guide vane
151: Guide part
152: Support plate
160: Monomer/solvent inlet
170: Catalyst inlet

The invention claimed is:

1. A reactor, comprising:

a reactor tank having an accommodation space therein for performing a polymerization reaction of a reactive fluid;

an outer refrigerant jacket positioned outside the reactor tank and having a refrigerant flowing therethrough;

an inner refrigerant jacket positioned inside the reactor tank and having a refrigerant flowing therethrough;

an impeller disposed in the accommodation space of the reactor tank and configured to induce directionality of the reactive fluid;

one or more guide vanes disposed inside the reactor tank and configured to guide a flow of the reactive fluid in the same direction as the impeller, and wherein the refrigerants of the outer refrigerant jacket and the inner refrigerant jacket flow in opposite directions to each other, wherein the outer refrigerant jacket comprises an outer refrigerant inlet through which the refrigerant enters the outer refrigerant jacket and an outer refrigerant outlet through which the refrigerant is discharged, wherein the inner refrigerant jacket comprises an inner refrigerant inlet through which the refrigerant enters the inner refrigerant jacket and an inner refrigerant outlet through which the refrigerant is discharged, wherein the outer refrigerant inlet and the inner refrigerant inlet are positioned on opposite sides of the reactor tank and spaced apart in a vertical direction, wherein the outer refrigerant outlet and the inner refrigerant outlet are positioned on opposite sides of the reactor tank and spaced apart in the vertical direction, wherein the outer refrigerant inlet and the inner refrigerant outlet are positioned at the lower end of the reactor tank, and the outer refrigerant outlet and the inner refrigerant inlet are positioned at the upper end of the reactor tank, wherein each of the outer refrigerant jacket and the inner refrigerant jacket comprises a pipe in which the refrigerant flows, wherein each of the pipes of the outer refrigerant jacket and the inner refrigerant jacket is wound in a coil shape, wherein the inner refrigerant jacket has a partition wall so that two flow paths are formed by the inner refrigerant jacket, a first flow path on the inside of the inner refrigerant jacket and a second flow path on the outside of the inner refrigerant jacket, wherein the outside of the inner refrigerant jacket faces the walls of the reactor tank, wherein the impeller is positioned inside and outside the inner refrigerant jacket, and induces ascent of the reactive fluid inside the inner refrigerant jacket and descent of the reactive fluid outside the inner refrigerant jacket, wherein the one or more guide vanes comprises:

a first guide vane; and a second guide vane, wherein the first and second guide vanes are disposed at opposite ends of the reactor tank along the vertical direction, and wherein each of the first and second guide vanes comprises a support plate and a guide part protruding from the support plate toward the accommodation space of the reactor tank.

2. The reactor of claim 1, wherein each of the pipes of the outer refrigerant jacket and the inner refrigerant jacket has a quadrangular cross-section.

3. The reactor of claim 1, further comprising:

a monomer/solvent inlet for supplying a monomer and a solvent to the accommodation space of the reactor tank; and a catalyst inlet for supplying a catalyst to the accommodation space of the reactor tank, wherein the monomer/solvent inlet and the catalyst inlet are provided on the sides on which the outer refrigerant inlet and the inner refrigerant inlet are positioned.

4. The reactor of claim 3, wherein the monomer/solvent inlet is on the same side of the reactor tank as the inner refrigerant inlet, and the catalyst inlet is on the same side of the reactor tank as the outer refrigerant inlet.

5. A reactor, comprising:

a reactor tank having an accommodation space therein for performing a polymerization reaction of a reactive fluid;

an outer refrigerant jacket positioned outside the reactor tank and having a refrigerant flowing therethrough;

an inner refrigerant jacket positioned inside the reactor tank and having a refrigerant flowing therethrough;

an impeller disposed in the accommodation space of the reactor tank and configured to induce directionality of the reactive fluid;

one or more guide vanes disposed inside the reactor tank and configured to guide a flow of the reactive fluid in the same direction as the impeller, and wherein the refrigerants of the outer refrigerant jacket and the inner refrigerant jacket flow in opposite directions to each other, wherein each of the outer refrigerant jacket and the inner refrigerant jacket comprises a pipe in which the refrigerant flows, wherein each of the pipes of the outer refrigerant jacket and the inner refrigerant jacket is wound in a coil shape, wherein the inner refrigerant jacket has a partition wall so that two flow paths are formed by the inner refrigerant jacket, a first flow path on the inside of the inner refrigerant jacket and a second flow path on the outside of the inner refrigerant jacket, wherein the outside of the inner refrigerant jacket faces the walls of the reactor tank, wherein the impeller is positioned inside and outside the inner refrigerant jacket, and induces ascent of the reactive fluid inside the inner refrigerant jacket and descent of the reactive fluid outside the inner refrigerant jacket, wherein the one or more guide vanes comprises:

a first guide vane; and a second guide vane, wherein the first and second guide vanes are disposed at opposite ends of the reactor tank along the vertical direction, and wherein each of the first and second guide vanes comprises a support plate and a guide part protruding from the support plate toward the accommodation space of the reactor tank.

* * * * *